US012183049B2

(12) United States Patent
Arroyo et al.

(10) Patent No.: US 12,183,049 B2
(45) Date of Patent: *Dec. 31, 2024

(54) METHODS, SYSTEMS, ARTICLES OF MANUFACTURE, AND APPARATUS TO CLASSIFY LABELS BASED ON IMAGES USING ARTIFICIAL INTELLIGENCE

(71) Applicant: Nielsen Consumer LLC, Chicago, IL (US)

(72) Inventors: Roberto Arroyo, Guadalajara (ES); David Jiménez-Cabello, Guadalajara (ES); Javier Martínez Cebrián, Madrid (ES)

(73) Assignee: Nielsen Consumer LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/492,532

(22) Filed: Oct. 23, 2023

(65) Prior Publication Data
US 2024/0135669 A1   Apr. 25, 2024
US 2024/0233309 A9   Jul. 11, 2024

Related U.S. Application Data

(63) Continuation of application No. 18/148,131, filed on Dec. 29, 2022, now abandoned, which is a
(Continued)

(51) Int. Cl.
*G06V 10/25* (2022.01)
*G06F 18/21* (2023.01)
(Continued)

(52) U.S. Cl.
CPC .......... *G06V 10/25* (2022.01); *G06F 18/2163* (2023.01); *G06F 18/22* (2023.01);
(Continued)

(58) Field of Classification Search
CPC ...... G06V 10/764; G06V 10/25; G06V 20/70; G06V 10/771; G06V 10/761;
(Continued)

(56) References Cited

U.S. PATENT DOCUMENTS 6,226,041 B1   5/2001   Florencio
6,282,317 B1   8/2001   Luo
(Continued)

FOREIGN PATENT DOCUMENTS

EP   2259207 B1   10/2012
JP   2015072586 A   4/2015
(Continued)

OTHER PUBLICATIONS

Hollander et al., "Logo Recognition in Video Stills by String Matching," IEEE, International Conference on Image Processing, 2003, 4 pages.
(Continued)

Primary Examiner — Utpal D Shah
(74) Attorney, Agent, or Firm — HANLEY, FLIGHT & ZIMMERMAN, LLC

(57) ABSTRACT

Example methods, apparatus, and articles of manufacture to classify labels based on images using artificial intelligence are disclosed. An example apparatus includes a regional proposal network to determine a first bounding box for a first region of interest in a first input image of a product; and determine a second bounding box for a second region of interest in a second input image of the product; a neural network to: generate a first classification for a first label in the first input image using the first bounding box; and generate a second classification for a second label in the second input image using the second bounding box; a comparator to determine that the first input image and the second input image correspond to a same product; and a
(Continued)

report generator to link the first classification and the second classification to the product.

20 Claims, 8 Drawing Sheets

Related U.S. Application Data continuation of application No. 17/072,740, filed on Oct. 16, 2020, now Pat. No. 11,544,509.

(60) Provisional application No. 63/046,363, filed on Jun. 30, 2020.

(51) Int. Cl.

| | | |
|---|---|---|
| G06F 18/22 | (2023.01) | |
| G06F 18/24 | (2023.01) | |
| G06F 18/25 | (2023.01) | |
| G06N 3/08 | (2023.01) | |
| G06T 3/40 | (2024.01) | |
| G06V 10/74 | (2022.01) | |
| G06V 10/764 | (2022.01) | |
| G06V 10/771 | (2022.01) | |
| G06V 10/80 | (2022.01) | |
| G06V 10/82 | (2022.01) | |
| G06V 20/70 | (2022.01) | |

(52) U.S. Cl.
CPC ............ *G06F 18/24* (2023.01); *G06F 18/251* (2023.01); *G06N 3/08* (2013.01); *G06T 3/40* (2013.01); *G06V 10/761* (2022.01); *G06V 10/764* (2022.01); *G06V 10/771* (2022.01); *G06V 10/809* (2022.01); *G06V 10/82* (2022.01); *G06V 20/70* (2022.01); *G06V 2201/10* (2022.01)

(58) Field of Classification Search
CPC .. G06V 10/809; G06V 10/82; G06V 2201/10; G06F 18/22; G06F 18/2163; G06F 18/24; G06F 18/251; G06N 3/08; G06T 3/40
See application file for complete search history.

(56) References Cited

U.S. PATENT DOCUMENTS

| | | | |
|---|---|---|---|
| 8,171,030 B2 | 5/2012 | Pereira | |
| 8,189,945 B2 | 5/2012 | Stojancic | |
| 8,195,689 B2 | 6/2012 | Ramanathan | |
| 8,229,227 B2 | 7/2012 | Stojancic | |
| 8,335,786 B2 | 12/2012 | Pereira | |
| 8,655,878 B1 | 2/2014 | Kulkarni | |
| 8,959,108 B2 | 2/2015 | Pereira | |
| 9,158,995 B2 | 10/2015 | Rodriguez-Serrano | |
| 9,628,837 B2 | 4/2017 | Davidson | |
| 10,007,863 B1 | 6/2018 | Pereira | |
| 10,614,582 B2 | 4/2020 | Pereira | |
| 10,902,291 B1* | 1/2021 | Kim | G06F 18/213 |
| 11,244,191 B2* | 2/2022 | Yao | G06V 10/7715 |
| 11,544,509 B2 | 1/2023 | Arroyo | |
| 2003/0076448 A1 | 4/2003 | Pan | |
| 2014/0079321 A1 | 3/2014 | Huynh-Thu | |
| 2016/0171429 A1 | 6/2016 | Schwartz | |
| 2016/0174902 A1 | 6/2016 | Georgescu | |
| 2016/0371634 A1* | 12/2016 | Kumar | G06V 10/462 |
| 2017/0192980 A1 | 7/2017 | Pereira | |
| 2017/0286773 A1 | 10/2017 | Skaff | |
| 2018/0204092 A1 | 7/2018 | Tohidi | |
| 2019/0050994 A1* | 2/2019 | Fukagai | G06F 18/24 |
| 2019/0304102 A1* | 10/2019 | Chen | G06N 20/00 |
| 2019/0318405 A1 | 10/2019 | Hu et al. | |
| 2020/0005225 A1* | 1/2020 | Chaubard | H04N 23/57 |
| 2020/0065623 A1* | 2/2020 | Kao | G06N 20/00 |
| 2020/0151448 A1* | 5/2020 | Lin | G06V 20/64 |
| 2020/0372047 A1* | 11/2020 | Wu | G06F 16/587 |
| 2020/0394824 A1* | 12/2020 | Kanzawa | G06V 20/58 |
| 2021/0319255 A1* | 10/2021 | Pham | G06F 18/2163 |
| 2021/0406614 A1 | 12/2021 | Arroyo | |
| 2022/0230310 A1* | 7/2022 | Xie | G06V 10/758 |
| 2023/0215141 A1 | 7/2023 | Arroyo et al. | |

FOREIGN PATENT DOCUMENTS

| | | |
|---|---|---|
| JP | 5869988 A1 | 2/2016 |
| KR | 101151851 B2 | 6/2012 |
| WO | 2021051857 A1 | 3/2021 |
| WO | 2021186176 A1 | 9/2021 |

OTHER PUBLICATIONS

Zaman et al., "Vision-Based Localization & Text Chunking of Nutrition Fact Tables on Android Smartphones," 2013, 8 pages.
Ren et al., "Faster R-CNN: Towards Real-time Object Detection with Region Proposal Networks," 2015, 14 pages.
Rothe el al., "Non-Maximum Suppression for Object Detection by Passing Messages Between Windows," Apr. 2015, 17 pages.
Zhang et al., "'Snap-n-Eat': Food Recognition and Nutrition Estimation on a Smartphone," Journal of Diabetes Science and Technology, vol. 9, No. 3, 2015, 9 pages.
Redmon et al., "You Only Look Once: Unified, Real-time Object Detection," IEEE, 2015, 10 pages.
Oliveira, "Sabado—Smart Brand Detection," Sep. 2, 2015, 92 pages.
Myers et al., "Im2Calories: Towards an Automated Mobile Vision Food Diary," IEEE, 2015, 9 pages.
Krizhevsky et al., "ImageNet Classification with Deep Convolutional Neural Networks," ACM, May 2017, 9 pages.
United States Patent and Trademark Office, "Restriction/Election Requirement," issued in connection With U.S. Appl. No. 15/172,826, dated Oct. 5, 2017, 7 pages.
Gundimeda et al., "An Automated Computer Vision System for Extraction of Retail Food Product Metadata," AICC 2018, 16 pages.
United States Patent and Trademark Office, "Notice of Allowance and Fee(s) Due," issued in connection with U.S. Appl. No. 15/172,826, dated Feb. 26, 2018, 12 pages.
United States Patent and Trademark Office, "Corrected Notice of Allowability," issued in connection with U.S. Appl. No. 15/172,826, dated Mar. 14, 2018, 8 pages.
Arroyo et al., "Deep Learning of Visual and Textual Data for Region Detection Applied to Item Coding," Nielsen Connect AI, 2019, 12 pages.
Arroyo et al., "Integration of Text-maps in Convolutional Neural Networks for Region Detection among Different Textual Categories," 2019, 4 pages.
Carpentier et al., "Evaluating the Impact of Chile's Marketing Regulation of Unhealthy Foods and Beverages: Preschool and Adolescent Children's Changes in Exposure to Food Advertising on Television," Public Health Nutrition, Jan. 24, 2019, 10 pages.
Rezatofighi et al., "Generalized Intersection over Union: A Metric and a Loss for Bounding Box Regression," Apr. 2019, 9 pages.
United States Patent and Trademark Office, "Notice of Allowance and Fee(s) Due," issued in connection with U.S. Appl. No. 16/018,011, dated Nov. 19, 2019, 11 pages.
Taillie et al., "An Evaluation of Chile's Law of Food Labeling and Advertising on Sugar-sweetened Beverage Purchases from 2015 to 2017: A Before-and-after Study," PLOS Medicine, Feb. 11, 2020, 22 pages.
Google, "Detect Text inImages," URL:[https://cloud.google.com/vision/docs/ocr], Mar. 16, 2021, 28 pages.
International Searching Authority, "Written Opinion," issued in connection with International Patent Application No. PCT/US2021/039924, mailed on Oct. 20, 2021, 3 pages.
International Searching Authority, "International Search Report," issued in connection with International Patent Application No. PCT/US2021/039924, mailed on Oct. 20, 2021, 3 pages.

(56) References Cited

OTHER PUBLICATIONS

United States Patent and Trademark Office, "Notice of Allowance and Fee(s) Due," issued in connection with U.S. Appl. No. 17/072,740, dated Aug. 18, 2022, 9 pages.

International Searching Authority, "International Preliminary Report on Patentability," issued in connection with International Patent Application No. PCT/US2021/039924, issued on Jan. 12, 2023, 5 pages.

Mexican Institute of Industrial Property, "Examination Notice and Priority Claim Result," issued in connection with Mexican Patent Application No. MX/a/2022/016461, dated Jan. 17, 2023, 6 pages. [English Machine Translation Included].

Mexican Institute of Industrial Property, "Formal Examination Report," issued in connection with Mexican Patent Application No. MX/a/2022/016461, dated Mar. 17, 2023, 4 pages. [English Machine Translation Included].

United States Patent and Trademark Office, "Non-Final Office Action," issued in connection with U.S. Appl. No. 18/148,131, dated May 22, 2023, 6 pages.

\* cited by examiner

METHODS, SYSTEMS, ARTICLES OF MANUFACTURE, AND APPARATUS TO CLASSIFY LABELS BASED ON IMAGES USING ARTIFICIAL INTELLIGENCE

RELATED APPLICATION

This patent arises from a continuation of U.S. patent application Ser. No. 18/148,131, filed Dec. 29, 2022, which claims priority to U.S. patent application Ser. No. 17/072,740 (now U.S. Pat. No. 11,544,509), filed Oct. 16, 2020, which claims priority to U.S. Provisional Patent Application No. 63/046,363, filed Jun. 30, 2020. U.S. patent application Ser. No. 18/148,131, U.S. patent application Ser. No. 17/072,740 and U.S. Provisional Patent Application No. 63/046,363 are hereby incorporated herein by reference in their entireties. Priority to U.S. patent application Ser. No. 18/148,131, U.S. patent application Ser. No. 17/072,740 and U.S. Provisional Patent Application No. 63/046,363 is hereby claimed.

FIELD OF THE DISCLOSURE

This disclosure relates generally to artificial intelligence, and, more particularly, to methods, systems, articles of manufacture, and apparatus to classify labels based on images using artificial intelligence.

BACKGROUND

In recent years, machine learning and/or artificial intelligence have increased in popularity. For example, machine learning and/or artificial intelligence may be implemented using neural networks. Neural networks are computing systems inspired by the neural networks of human brains. A neural network can receive an input and generate an output. The neural network can be trained (e.g., can learn) based on feedback so that the output corresponds a desired result. Once trained, the neural network can make decisions to generate an output based on any input. Artificial Intelligence models, such as neural networks are used for the emerging fields of artificial intelligence and/or machine learning.

Figure 1:
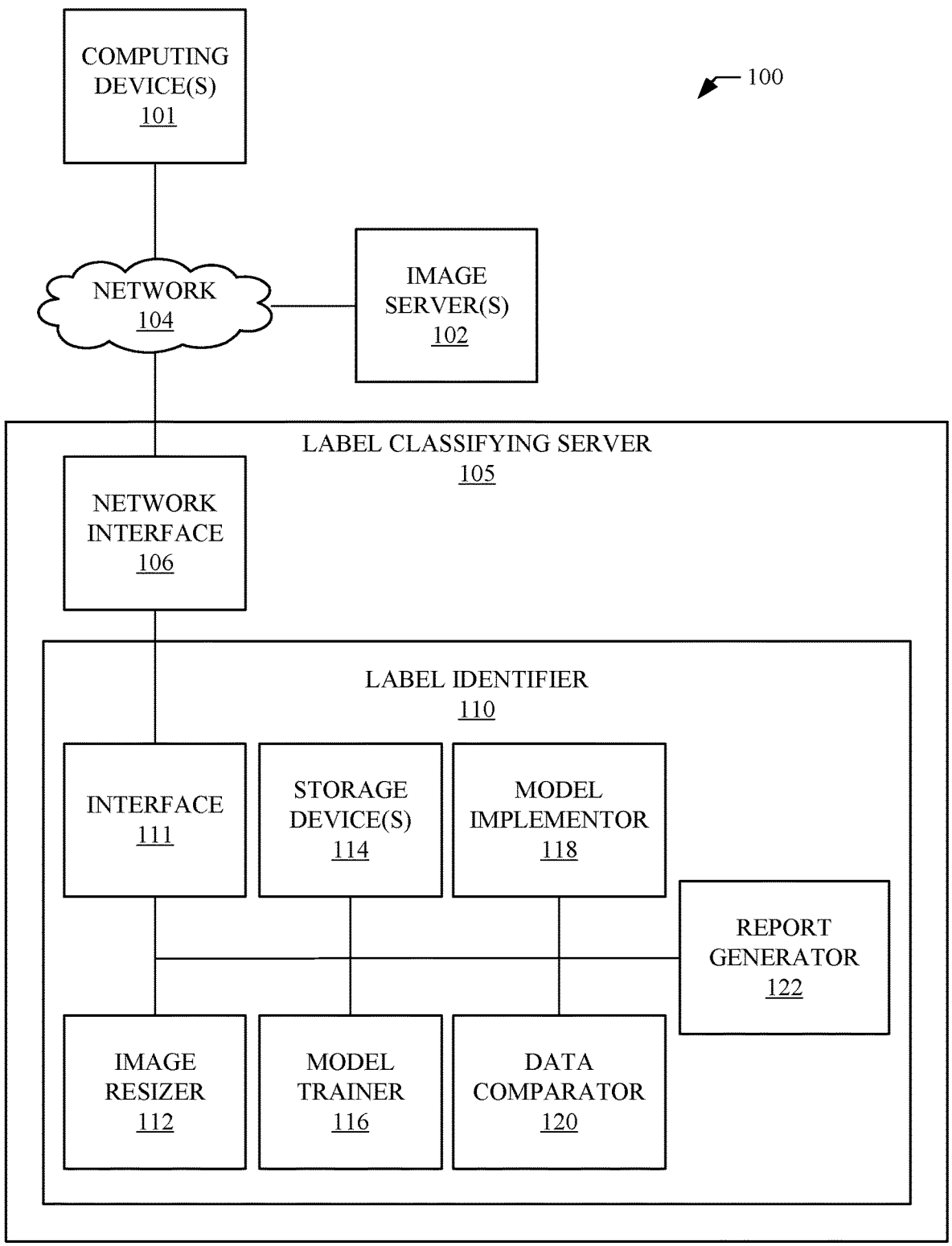
FIG. 1 is a block diagram of an example implementation of a label identifier to classify labels based on images using artificial intelligence.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Product packages typically include information related to the product and/or characteristics of the product. For example, a product package may include nutritional information (Nutriscore label, Nutrition label, ingredient label), warnings (e.g., high fat content, high sodium content, high sugar content, high calories, global harmonized system (GHS) labels, national fire protection association (NFPA) labels, etc.), certifications (e.g., certified vegan, certified halal, certified non-genetically modified organism (GMO), certified kosher, certified organic, a United States department of agriculture (USDA) certification, etc.), awards (e.g., completion awards), and/or any other type of labelling. Such information may be based on governmental regulations, industry standards, trademarks, etc. Item coding is used to digitally link products with information corresponding to the labels located on the product. In this manner, a database can be generated that links products to corresponding labels, which can be used a digital reference for the products.

An artificial intelligent (AI) model (e.g., a machine learning (ML), deep learning (DL), and/or other AI-based approach) may be used to perform such item coding. For example, images of a product may be input into an AI-based model to identify particular labels in the image and link the label to the product. To achieve the most accurate results, the images of the products are taken in a studio with optimal lighting condition, background conditions, focus, glair, framing, etc. on a high definition camera. However, because the cost and time to generate such studio images is high, the volume of such high quality images is low.

The volume of non-studio images of products, such as images taken by consumers and/or auditors (e.g., crowd-sourced images), is high. However, such images tend to be lower quality than studio images. For example, images taken by non-professionals, not in a studio, tend to have inferior lighting, focus, framing, resolution, background conditions, glare, etc. However, traditional AI-based approaches struggle to accurately classify labels in non-studio images.

Examples disclosed herein identify and classify labels of products based on image(s) of the products more efficiently and/or effectively than traditional AI-based techniques, regardless of the quality of the images. Examples disclosed herein use a regional-based AI model (e.g., a regional-based convolutional neural network (R-CNN)) to identify and classify labels of a product. The regional AI-based model includes a regional proposal network (RPN) to detect label (s) of interest in a photo and a AI-based model (e.g., a CNN) to classify the label based on the detected label(s) of interest. In this manner, instead of focusing on an entire image that includes irrelevant information (e.g., parts of the image that do not correspond to a label to be classified), examples disclosed herein only focus on regions of interest and discard regions outside of the region of interest, thereby increasing the accuracy of the CNN-based classification.

For example, a government or agency may mandate that packaged food includes different labels for different nutritional categories (e.g., high fat, high sodium, high sugar, high calories) when the package food contains more than a threshold amount of one of the respective categories. In such an example, images of a product may be input to the R-CNN, where the RCP identifies regions in the image where a label is likely present, and the CNN classifies the label as one or the four nutritional categories. Using examples disclosed herein, item coding can be efficiently performed on a much higher volume of mixed-quality images of products than could be performed with the lower volume of studio images of products.

Additionally, examples disclosed herein link multiple classified labels together from different images of the same product. For example, if a user takes a photo of a product at an awkward angle, extreme angle and/or otherwise insufficient angle necessary to accurately read one or more labels, one or more labels may be missing and/or unreadable from the image. However, a second image of the product at a different angle may provide a clearer photo of the previously missing or unreadable label. Accordingly, examples disclosed herein identify images that correspond to the same product and combine labels from the multiple images to provide a complete link of labels to the product.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a region-based convolutional neural network model is used. In general, machine learning models/architectures that are suitable to use in the example approaches disclosed herein will be neural network based models (e.g., convolution neural network (CNN), deep neural network (DNN), etc.) including explainability to be able to determine which factors were important for the neural network based model in generating an output, of a graph neural network (GNN) that provides some insight into the inner structure of the network model. However, other types of machine learning models could additionally or alternatively be used such as deep learning and/or any other type of AI-based model.

In general, implementing a ML/AI system involves two phases, a learning/training phase, and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs). As used herein, inputs with corresponding labeled outputs is referred to as training data.

In examples disclosed herein, ML/AI models are trained using images that have been labelled with label types included in the image. However, any other training algorithm may additionally or alternatively be used. In examples disclosed herein, training is performed until an acceptable amount of error is achieved. In examples disclosed herein, training is performed at a server of a controlling entity and/or by a user of a processing device. Training is performed using hyperparameters that control how the learning is performed (e.g., a learning rate, a number of layers to be used in the machine learning model, etc.). In some examples re-training may be performed. Such re-training may be performed in response to additional training data.

Training is performed using training data. In examples disclosed herein, the training data originates from processing devices and/or servers on a network. Because supervised training is used, the training data is labeled. Labeling is applied to the training data by the entity, the server, or a user of a processing device.

Once training is complete, the model is deployed for use as an executable construct that processes an input and provides an output based on the network of nodes and connections defined in the model. The model is stored at the server of the entity. The model may then be executed by a processing device and/or a server to classify labels based on input images.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

FIG. 1 illustrates an example environment 100 that facilitates the classification of labels based on images using artificial intelligence. The example environment 100 includes example computing device(s) 101, example image server(s) 102, an example network 104, and an example label classifying server 105. The label classifying server 105 includes an example network interface 106, an example storage 108, and an example label identifier 110. The example label identifier 110 includes an example interface 111, an example image resizer 112, example storage device(s) 114, an example model trainer 116, example model implementor 118, example data comparator 120, and an example report generator 122.

The example computing device(s) 101 of FIG. 1 is/are devices that include a sensor (e.g., a camera) to capture an image. For example, the computing device(s) 101 may be a mobile phone, a computer, a camera, a video camera, and/or any other computing device that includes and/or is in communication with (e.g., via a wired or wireless connection) a image capturing sensor. A user can utilize the computing device(s) 101 to take an image of a product with labels on in and transmit the image to the example label classifying server 105 via the example network 104. Accordingly, the images captured by the computing device(s) 101 can be crowdsourced images. The example image server(s) 102 of FIG. 1 store(s) and/or obtain(s) images from any source. For example, the image server(s) 102 may include a database of images of products. The example image server(s) 102 may obtain image(s) from the computing device(s) 101 and/or from any other device. In some examples, the image server(s) 102 include(s) training data that can be transmitted to the label classifying server 105 via the network 104.

The example network 104 of FIG. 1 is a system of interconnected systems exchanging data. The example network 104 may be implemented using any type of public or private network such as, but not limited to, the Internet, a telephone network, a local area network (LAN), a cable network, and/or a wireless network. To enable communication via the network 104, the example computing device(s) 101, the example image server(s) 102, and the label classifying server 105 include a communication interface that enables a connection to an Ethernet, a digital subscriber line (DSL), a telephone line, a coaxial cable, or any wireless connection, etc.

The example label classifying server 105 includes the example network interface 106 to obtain images via the example network 104. The example label classifying server 105 further includes the label identifier 110. Although the label identifier 110 is included in the label classifying server 105, the example label identifier 110 may be implemented in any device (e.g., the computing devices (1) 101 and/or the image server(s) 102)) to identify labels from images of products.

The example interface 111 of FIG. 1 obtains images of products via the network interface 106. If the label identifier 110 is implemented locally in one of the computing device(s) 101 and/or one of the image server(s) 102, the interface 111 may obtain images directly from the corresponding device. The interface 111 may obtain the images may be from an external database and/or server via a network communication. The interface 111 may obtain training images (e.g., images that have been prelabelled with the corresponding classification for training purposes) and/or images to be classified (e.g., after a classification model has been trained) from the image server(s) 102 via the network 104.

The example image resizer 112 of FIG. 1 resizes the image to a predefined size. Because the images may be from different sources (e.g., different cameras, taken with different resolutions, from different types of devices, etc.), the images may be sized to different sizes. The example image resizer 112 resizes the image to a predefined size so that the size of all the images being processed are uniform. The predefined size may be based on user and/or manufacturer preferences.

The example storage device(s) 114 of FIG. 1 store(s) the validated training data (e.g., pre-classified images known as ground truth data) and/or images to be classified. Additionally, the example storage device(s) 114 may store trained model data. The trained model data corresponds to the parameters for implementing a trained model (e.g., hyperparameters, weights for neurons, algorithms, etc.). In this manner, the model implementor 118 can implemented a trained model using new obtained images to classify labels included in the image. Additionally, the example storage device(s) 114 may store reports generated by the report generator 112. The example storage device(s) 114 may be separate storage devices (e.g., one for the training data, one for trained model data, one for reports), may be a single storage device (e.g., for the training data, the trained model data, and the reports), and/or any combination thereof.

The example model trainer 116 of FIG. 1 trains the models (e.g., region-based AI model(s), region-based neural network(s), region-based machine learning model(s), region-based deep learning model(s), region-based convolution neural network(s), and/or any other region-based another type(s) of AI-based model(s) and/or network(s)) stored in the example storage device(s) 114. Initially, a model(s) is/are untrained (e.g., the neurons are not yet weighted) and the hyperparameters are set to initial values. The example model trainer 116 of FIG. 1 trains a model by tuning the hyperparameters of the RPN part of the model and training the AI-model (e.g., the CNN) part of the model based on known (e.g. validated) training data (e.g., images as inputs and corresponding known classifications as desired outputs). For example, the model trainer 116 may configure the hyperparameters corresponding to the scale (e.g., size) and ratios (e.g., shape) of anchors. The anchors are bounding boxes that are generated by the RPN to identify points of interest in an image that likely correspond to label of interest or zone or interest. In some examples, the model trainer 116 may train the hyperparameters for the anchor scales [2, 4, 6] corresponding to anchor sizes and [0.5, 1, 2] corresponding to anchor shape (e.g., a rectangle of a first orientation, a square, and a rectangle of a second orientation, respectively). Additionally, the model trainer 116 may tune the hyperparameters to set the learning rate (e.g., how quickly the RPN learns a model) to $11^{-6}$ and setting the regularization to be applied by a means of dropout (e.g., keep probability model) of 0.7. Additionally, the model trainer 116 sets a confidence threshold of 0.4 for discharging bounding boxes with low confidences, as further described below. Additionally, the model trainer 116 number of epochs to 110 for the final region detection model of the RPN.

After the RPN is tuned, the example model trainer 116 of FIG. 1 weights parameters of the AI-based model portion of the model (e.g., neurons of a neural network) to configure the model to classify the portion of the image corresponding to the bounding boxes of the RPN as a particular label. As described above, the model trainer 116 may train a model with a first set of training data and test the model with a second set of the training data. If, based on the results of the testing, the accuracy of the model is below a threshold, the model trainer 116 can tune (e.g., adjust, further train, etc.) the parameters of the model using additional sets of the training data and continue testing until the accuracy is above the threshold. After the model is trained, the storage device(s) 114 may storing the model training data (e.g., corresponding to how to implement the trained model (e.g., the weights to apply to the neurons to classify labels based on the training)) and/or the interface 111 may deploy the model data to another device (e.g., so that the device can implement the trained model). The training process is further described below in conjunction with FIG. 3.

The example model implementor 118 of FIG. 1 implements a trained and/or deployed model to take input images, generate bounding boxes (e.g., anchor boxes) for regions of interest for the image, and classify labels based on the bounding boxes. For example, the model implementor 118 obtains an image of a product and outputs values or percentages corresponding to the likelihood that the image includes one or more labels that the model has been trained to identify (e.g., if the model was trained to identify four different labels, the output is four values or percentages corresponding to the likelihood that the image includes the respective four labels). The implementation of the model is further described below in conjunction with FIGS. 4A and 4B.

The example data comparator 120 of FIG. 1 compares data to be able link different labels for different images of the same product together. As described above, some images may not be able to capture or clearly capture all of the labels for a product in one image. Accordingly, classified labels from different images may need to be linked together for a particular product. Accordingly, the example data comparator 120 compares data associated with the images to determine which images correspond to the same product and links the images. In this manner, the report generator 122 can compile the labels from the different images of the same product to identify all labels that correspond to a product. The example data comparator 120 may compare the file name, metadata, etc. to identify images that correspond to the same product.

The example report generator 122 of FIG. 1 generates a report identify classified label(s) or information corresponding to classified label(s) with respect to a particular product. For example, if two different images have been linked to the same product and the model implementor 118 has output a probability higher than a threshold amount that the first linked image includes a "high sugar" label and the second linked image includes a "high calorie" label, the report generator 122 generates a report that the product corresponds to high sugar content and high calorie content. The report generator 122 may include the image and/or generated bounding boxes in the report. The report may be a document and/or a data packet that includes the report. The example interface 111 can transmit the report to another device (e.g., a server, an external database, etc.) and/or the storage device(s) 114 may store the report locally.

Figure 2:
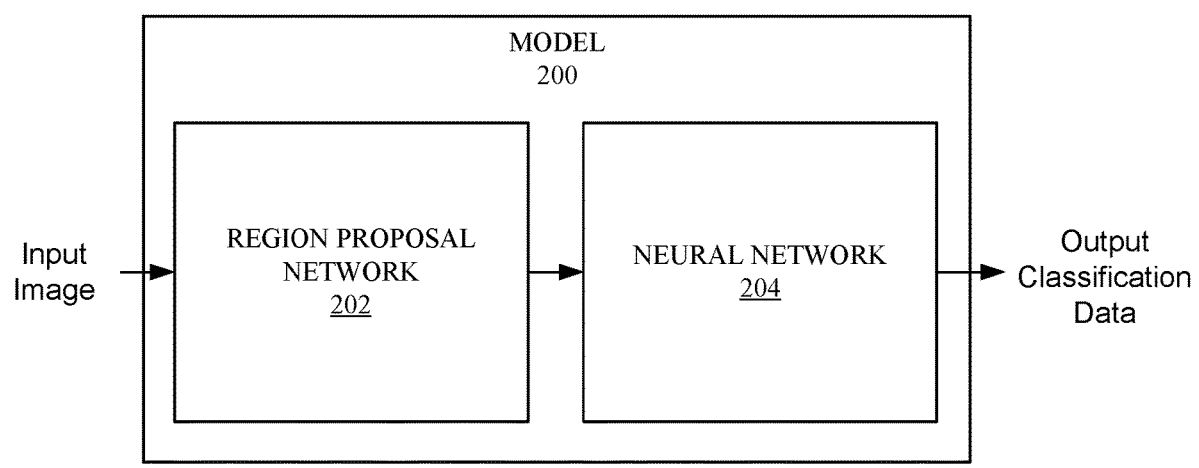
FIG. 2 is an example model that may be trained and/or implemented by the label identifier of FIG. 1.

FIG. 2 is an example illustration of a model 200 that may be trained by the example model trainer 116 and/or implemented by the example model implementor 118 of FIG. 1. The example model 200 includes an example regional proposal network (RPN) 202 and an example neural network 204.

The example regional proposal network 202 of FIG. 2 finds regions of interest where a label may be present in an image. For every point in an image, the example regional proposal network 202 is programmed to determine (e.g., 'learns') whether a logo is present in an image. The example regional proposal network 202 generates several anchors (e.g., bounding boxes) over the input image at different locations. The anchors indicate a possible object in various sizes and aspect rations at the location (e.g., based on the hyperparameters). The example RPN 202 may perform a non-maximum suppression (NMS) technique to keep only the most significant regions of interest, as further described below in conjunction with FIGS. 4A and 4B. The example RPN 202 outputs the bounding boxes of interest to the example neural network 204.

The example neural network 204 of FIG. 2 classifies labels based on the input bounding boxes. The neural network 204 is a convolutional neural network. However, the neural network 204 can be any type of AI-based model. Because the neural network 204 is focused on the bounding boxes, as opposed to the entire image, the neural network 204 generates much more accurate results then attempting to classify labels based on an entire image. The neural network 204 outputs the classification as probabilities that the inputted bounding boxes include one or more labels that the neural network 204 has been trained to identify.

While an example manner of implementing the example label identifier 110 of FIG. 1 is illustrated in FIG. 1, one or more of the elements, processes and/or devices illustrated in FIG. 1 may be combined, divided, re-arranged, omitted, eliminated, and/or implemented in any other way. Further, the example interface 111, the example image resizer 112, the example storage device(s) 114, the example model trainer 116, the example model implementor 118, the example data comparator 120, the example report generator 122, and/or, more generally, the example label identifier 110 of FIG. 1 may be implemented by hardware, software, firmware and/or any combination of hardware, software and/or firmware. Thus, for example, any of the example interface 111, the example image resizer 112, the example storage device(s) 114, the example model trainer 116, the example model implementor 118, the example data comparator 120, the example report generator 122, and/or, more generally, the example label identifier 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 111, the example image resizer 112, the example storage device(s) 114, the example model trainer 116, the example model implementor 118, the example data comparator 120, the example report generator 122, and/or, more generally, the example label identifier 110 of FIG. 1 is/are hereby expressly defined to include a non-transitory computer readable storage device or storage disk such as a memory, a digital versatile disk (DVD), a compact disk (CD), a Blu-ray disk, etc. including the software and/or firmware. Further still, the example label identifier 110 of FIG. 1 may include one or more elements, processes and/or devices in addition to, or instead of, those illustrated in FIG. 1, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
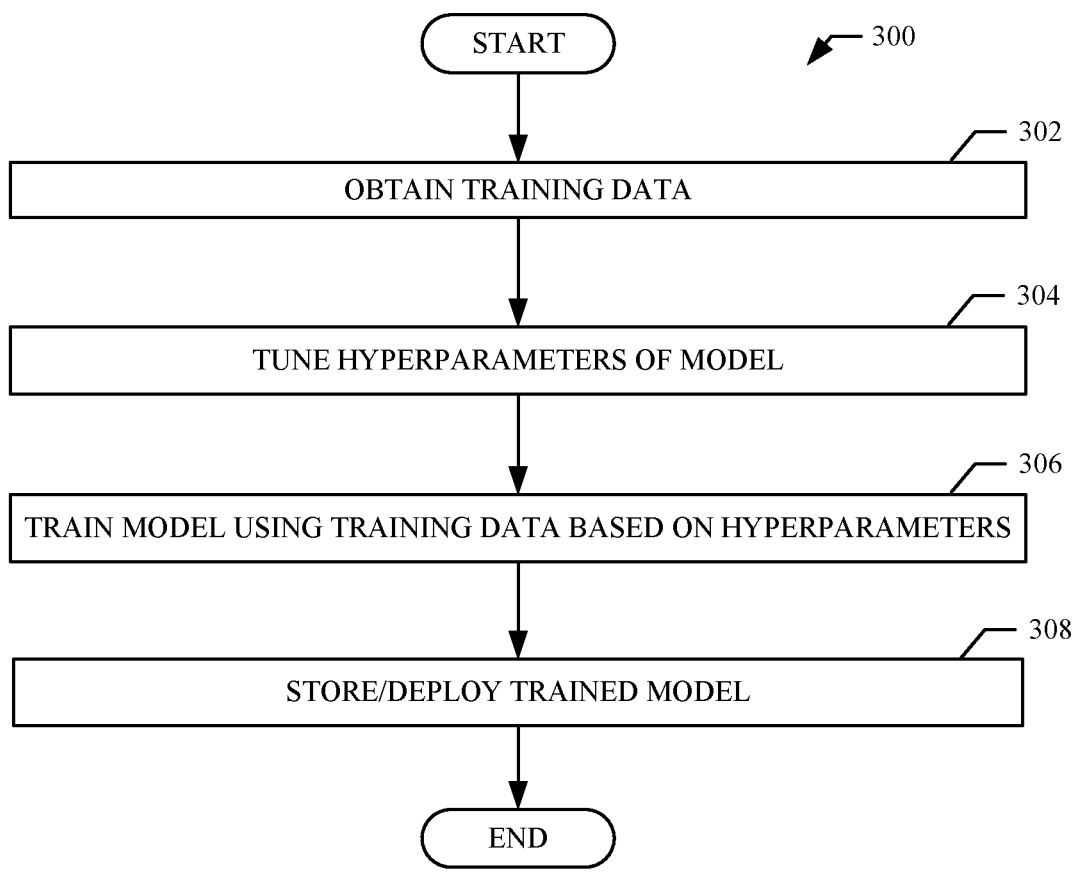
FIG. 3 illustrates a flowchart representative of machine readable instructions which may be executed to implement the label identifier of FIG. 1 to train a model to classify labels from an image of a product.
Figure 4A:
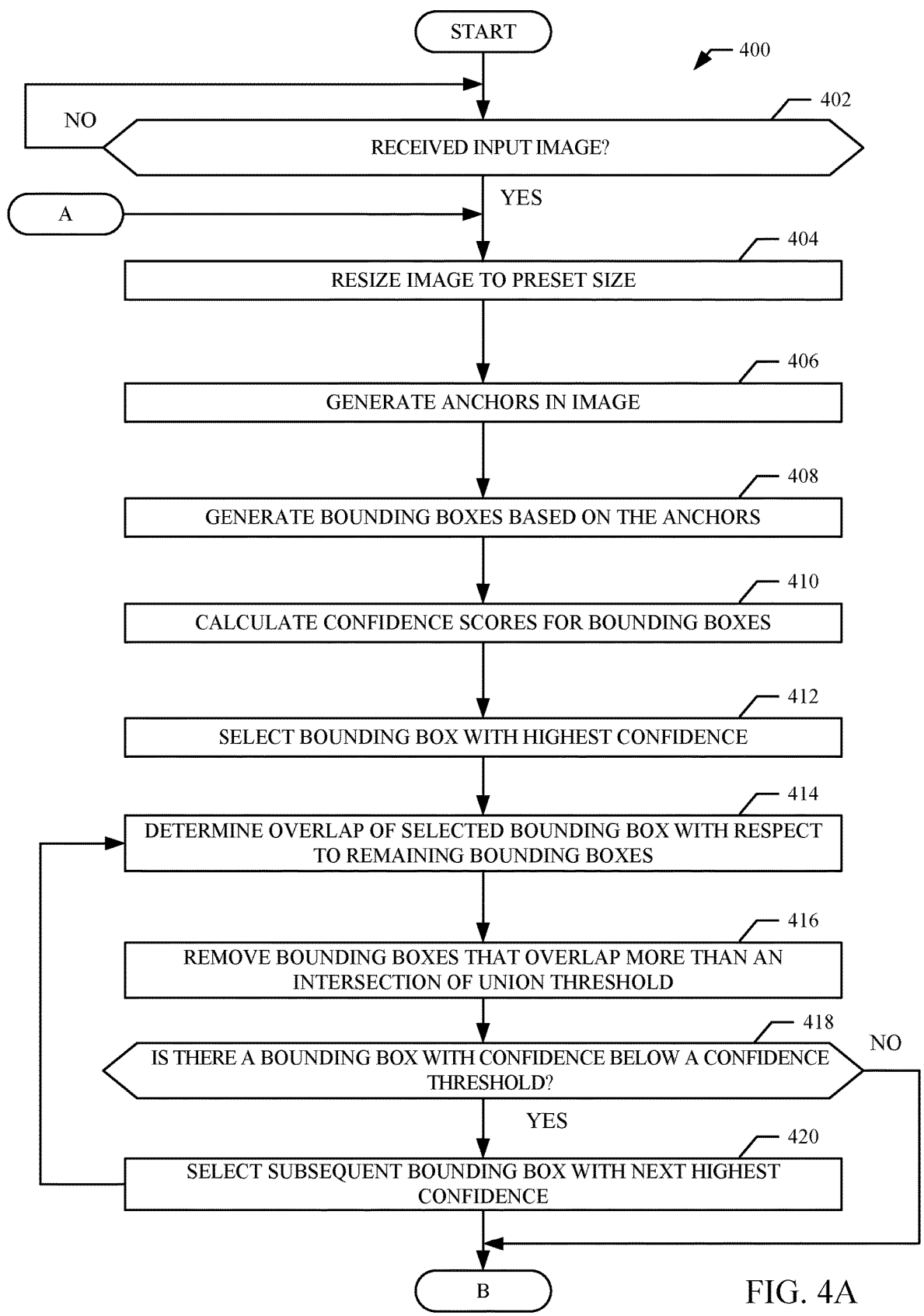
FIGS. 4A and 4B illustrate a flowchart representative of machine readable instructions which may be executed to implement the label identifier of FIG. 1 to implement a trained model.

Flowcharts representative of example hardware logic, machine readable instructions, hardware implemented state machines, and/or any combination thereof for implementing the example label identifier 110 of FIG. 1 are shown in FIGS. 3, 4A and/or 4B. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 3, 4A and/or 4B many other methods of implementing the example label identifier 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 3, 4A and/or 4B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B.

Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a," "an," "first," "second", etc.) do not exclude a plurality. The term "a" or "an" entity, as used herein, refers to one or more of that entity. The terms "a" (or "an"), "one or more," and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 illustrates an example flowchart representative of machine readable instructions 300 that may be executed to implement the example label identifier 110 of FIG. 1 to train a model to classify labels. Although the instructions 300 are described in conjunction with the example label identifier 110 of FIG. 1, the instructions 300 may be described in conjunction with any type of label identifier.

At block 302, model trainer 116 obtains training data from the example storage device(s) 114 and/or the example interface 111. As described above, the training data includes reclassified images of products with known labels. If the training data includes images of different sizes, the example image resizer 112 may resize the images to a uniform size. At block 304, the example model trainer 116 tunes the hyperparameters of the model. For example, the model trainer 116 can tune the hyperparameters as described above in conjunction with FIG. 1.

At block 306, the example model trainer 116 trains the model using the training data and based on the hyperparameters. For example, the model trainer 116 may utilize the training data to convert the images into bounding boxes of interest and tune the model (e.g., adjust the weights of the neurons) to output the known classification of the corresponding input training data. In some examples, the model trainer 116 utilizes a first group of the training data for initial training, and tests the initially trained model with a second group of the training data. If the number and/or percentage of misclassifications is above a threshold, the model trainer 116 will use a third group of the training data to further train and/or tune the model until the efficacy of the model increases above a threshold. The training/testing phases may occur any number of times with any number of training data groupings. At block 308 (e.g., after the efficacy of the model satisfies a threshold), the model trainer 116 stores trained model data corresponding to implementation of the trained model in the storage device(s) 114 and/or deploys the model training data to another device via the interface 111.

Figure 4B:
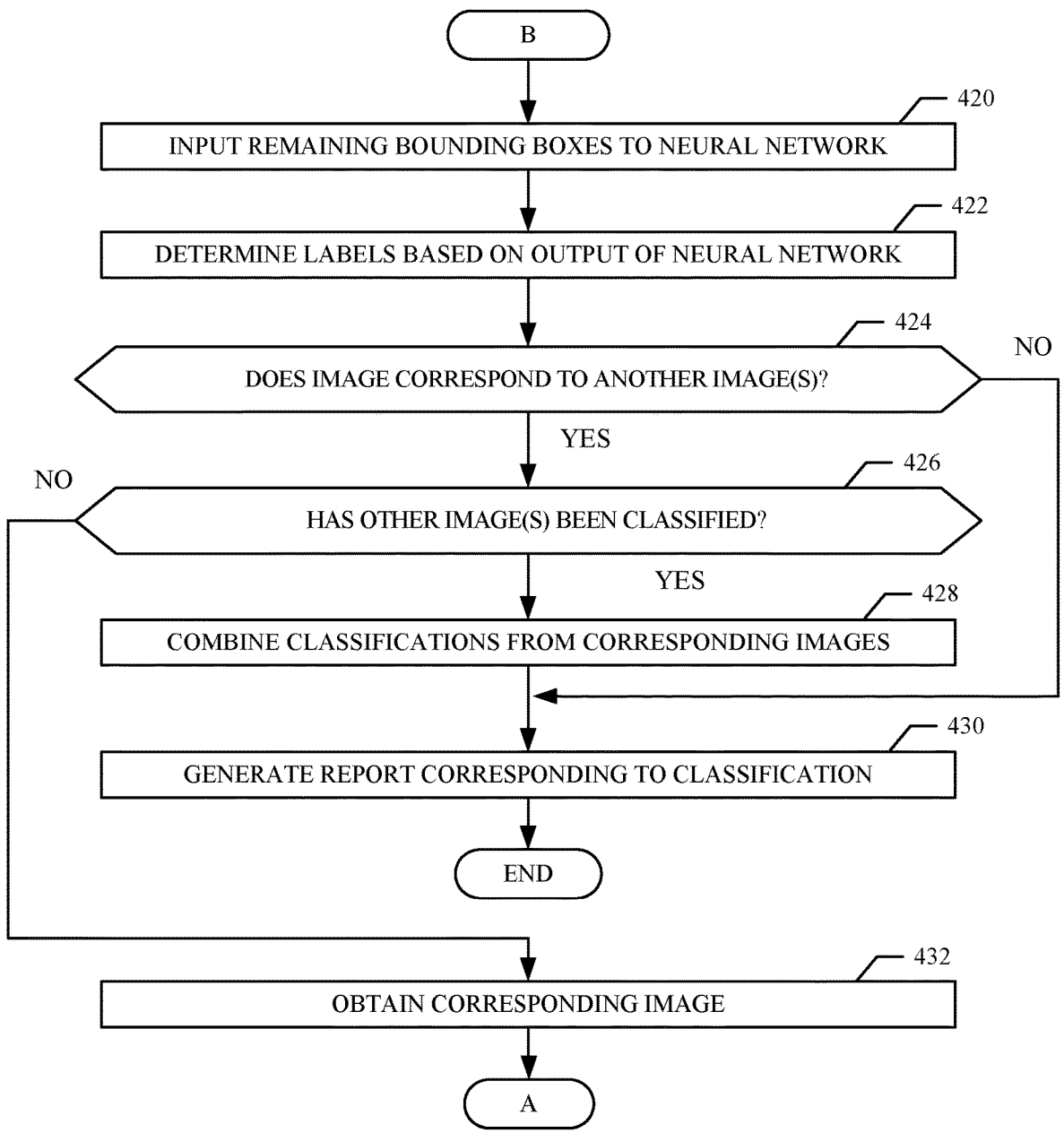

FIGS. 4A and 4B illustrate an example flowchart representative of machine readable instructions 400 that may be executed to implement the example label identifier 110 of FIG. 1 to classify labels of a product. Although the instructions 400 are described in conjunction with the example label identifier 110 of FIG. 1, the instructions 400 may be described in conjunction with any type of label identifier.

At block 402, the example image resizer 112 determines if an input image has been obtained (e.g., via the interface 111 and/or the storage device(s) 114). If the example image resizer 112 determines that an image has not been obtained (block 402: NO), control returns to block 402 until an input image is obtained. If the example image resizer 112 determines that an input image has been obtained (block 402: YES), the example image resizer 112 resizes the image to a preset size (block 404).

At block 406, the example model implementor 118 causes the RPN 202 to generate anchors in the input image. The anchors represent points of interest in the image. At block 408, the example model implementor 118 causes the RPN 202 to generate bounding boxes based on the anchors. The bounding boxes can be multiple boxes of different shapes and sizes according to the hyperparameters set by the model trainer 116. At blocks 410-420, the example model implementor 118 utilizes the RPN 202 to implement a non-maximum suppression protocol to select the most significant bounding boxes to output to the neural network 204.

At block 410, the example model implementor 118 utilizes the RPN 202 to calculate confidence scores or classification scores for the bounding boxes. At block 412, the example model implementor 118 utilizes the RPN 202 to select the bounding box with the highest confidence score. At block 414, the example model implementor 118 utilizes the RPN 202 to determine the amount of overlap of the selected bounding box with respect to the remaining bounding boxes. At block 416, the example model implementor 118 utilizes the RPN 202 to remove the bounding boxes that overlap more than an intersection of union threshold. At block 418, the example model implementor 118 utilizes the RPN 202 to determine whether there is a bounding box with a confidence below a confidence threshold (e.g., based on user and/or manufacturer preferences). If the example RPN 202 determines that there is at least one bounding box with a confidence below the confidence threshold (block 418: YES), the example model implementor 118 utilizes the RPN 202 to select a subsequent bounding box with the next highest confidence (block 420), and control returns to block 414 until the remaining bounding boxes have confidences above the confidence threshold.

If the example RPN 202 determines that there is not a bounding box with a confidence below the confidence threshold (block 418: NO), the example model implementor 118 utilizes the RPN 202 to input the remaining bounding boxes into the neural network 204 of the model. The example model implementor 118 utilizes the neural network 204 to determine classification outputs (e.g., corresponding to likelihood that one or more particular labels are included in the bounding boxes) in the input image based on the output bounding boxes. At block 422, the example report generator 122 determines the labels based on the output probabilities of the neural network 204. For example, if the neural network 204 outputs a 0.9 for a first label and a 0.8 for a second label, and the threshold for a positive match is set to 0.6, then the example report generator 122 determines that the first and second labels are present in the image.

At block 424, the example data comparator 120 determines if the selected image corresponds to another image. In some examples, the report generator 122 determine if the selected image corresponds to another image by identify other image(s) with a file name, metadata, etc. that correspond(s) to the same product. For example, if the image has a file name that includes all of a product name or part of a product name, the report generator 122 may determine that the two image files correspond to the same product. In some examples, the images may be preprocessed (e.g., by the user that took the photo and/or by another device) to identify and/or label the image as being a particular product. In such examples, the image may include metadata including the product identification. In this manner, any image with the same metadata can be linked.

If the example data comparator 120 determines that the processed image does not correspond to another image (block 424: NO), control continues to block 430. If the example data comparator 120 determines that the processed image corresponds to another image (block 424: YES), the example report generator 122 determines if the other image (s) has/have been classified (block 426). If the report generator 122 determines that the other image(s) has/have not been classified (block 426: NO), the example model implementor 118 obtains the corresponding image(s) (block 432), and control returns to block 404 to classify the corresponding image(s). If the report generator 122 determines that the other image(s) has/have been classified (block 426: YES), the example report generator 122 combines the classifications (e.g., identified labels) for the corresponding images to be included with respect to the product corresponding to the multiple images (block 428). At block 430, the example report generator 122 generates a report corresponding to the classification(s) for the product. The report may be stored locally (e.g., in the example storage device(s) 114) or may transmitted to another external device or storage (e.g., via the interface 111).

Figure 5:
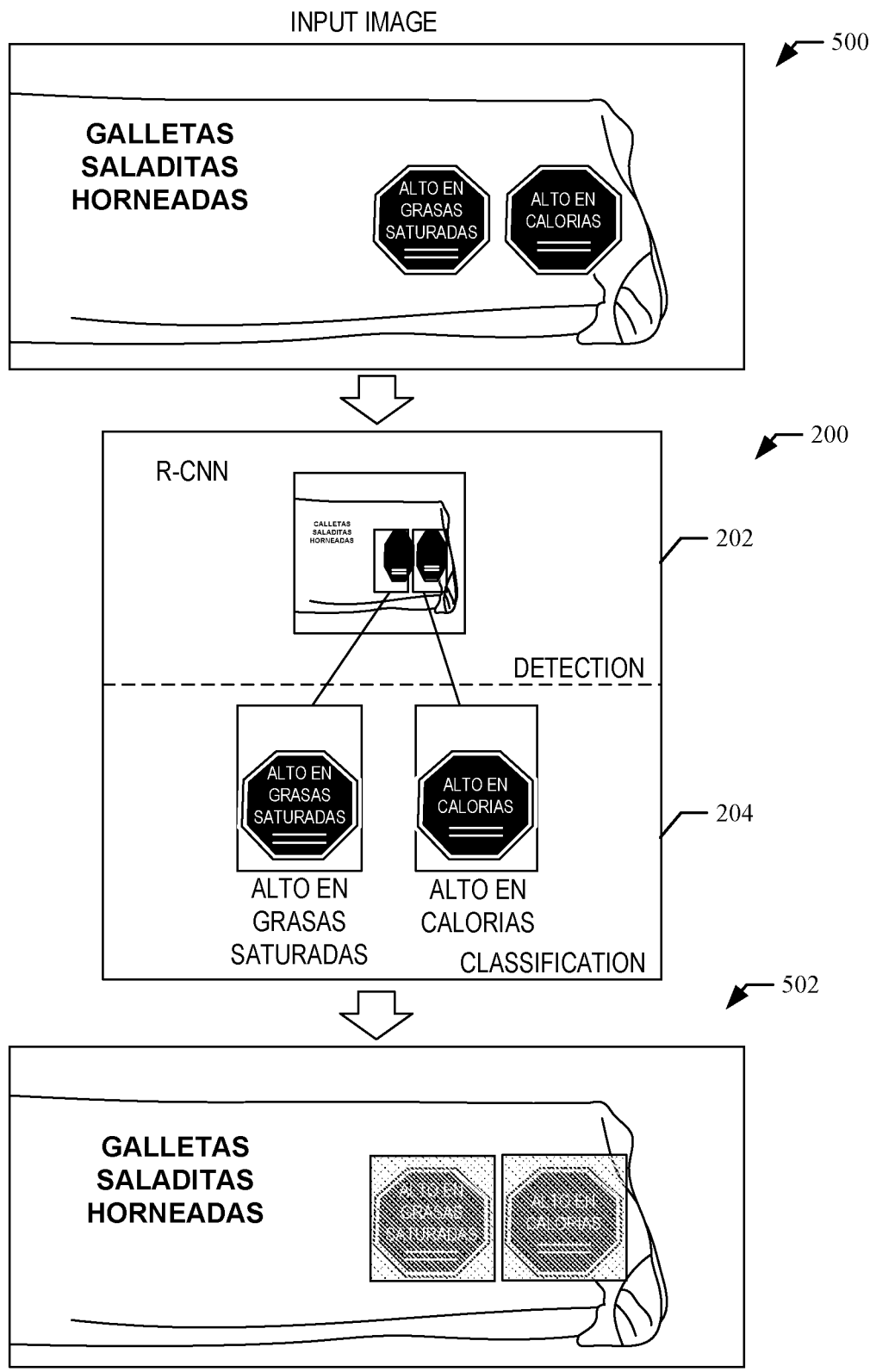
FIG. 5 illustrates classification of an image using the label identifier of FIG. 1.

FIG. 5 illustrates an example image 500 of a package for cookies that includes government mandated labels for when a food item has high saturated fat and is high in calories (e.g., based on the nutritional guidelines set forth by the government). FIG. 5 includes the example model 200, the example RPN 202, and the example neural network 202 of FIG. 2 and the example input image 500 and an example output image 504. The example input image 500 is a user-taken image of the packaging of the product that includes two labels: a 'high saturated fat' label and a 'high calorie' label. The example image 500 is input into the model 200, where the RPN 202 outputs the bounding boxes of interest to the neural network 204. The example neural network 204 classifies the images in the bounding boxes to identify the high saturated fat label and the high calorie label, as illustrated in the output recognition. In some examples, the output recognition image 502 may be included in the report.

Figure 6:
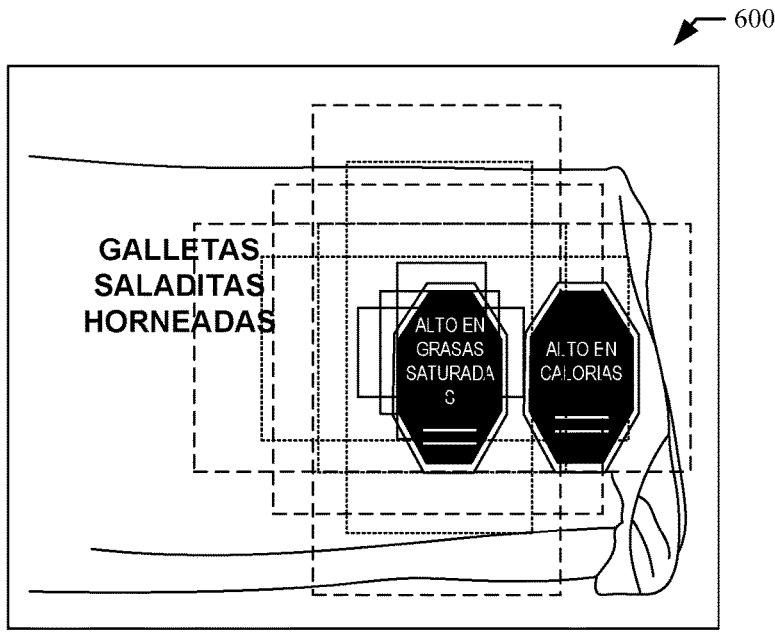
FIG. 6 illustrates bounding boxes that may be generated by the label identifier of FIG. 1.

FIG. 6 illustrate an example image 600 taken by a computing device (e.g., the example computing device 101 of FIG. 1) of a product with one or more labels. The example image 600 illustrates the bounding boxes that RPN 202 can be initially generate when selecting bounding boxes of interest. As shown in the image 600, the bounding boxes vary in size and shape based on the hyperparameters used for the RPN 202.

Figure 7:
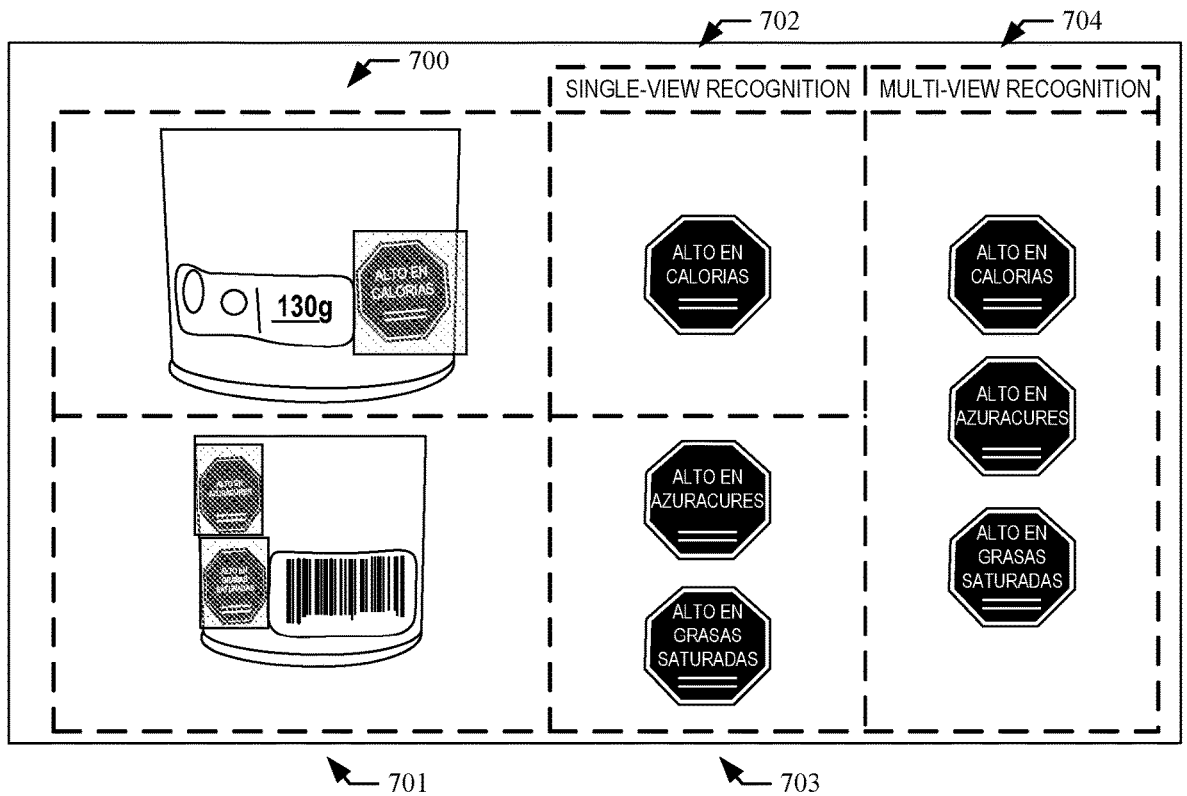
FIG. 7 illustrates a multi-image linking protocol that may be performed by the label identifier of FIG. 1.

FIG. 7 illustrates an example of two single-view images 700, 701 of the same product, where each image includes labels that are not included in the other image. For example, the first image 700 includes a high calorie label, as illustrated in the example singe view recognition box 702 for the first image, and the second image 701 includes a high sugar label and a high saturated fat label, as illustrated in the single view-recognition box 703 for the second image. As described above the example label identifier 110 determines that the two images correspond to the same product and link the classified labels, as shown in the example multi-view recognition box 704. Accordingly, the example label identifier 110 determines that the product imaged in the two images has been labelled as being high calorie, high sugar content, and high saturated fats content.

Figure 8:
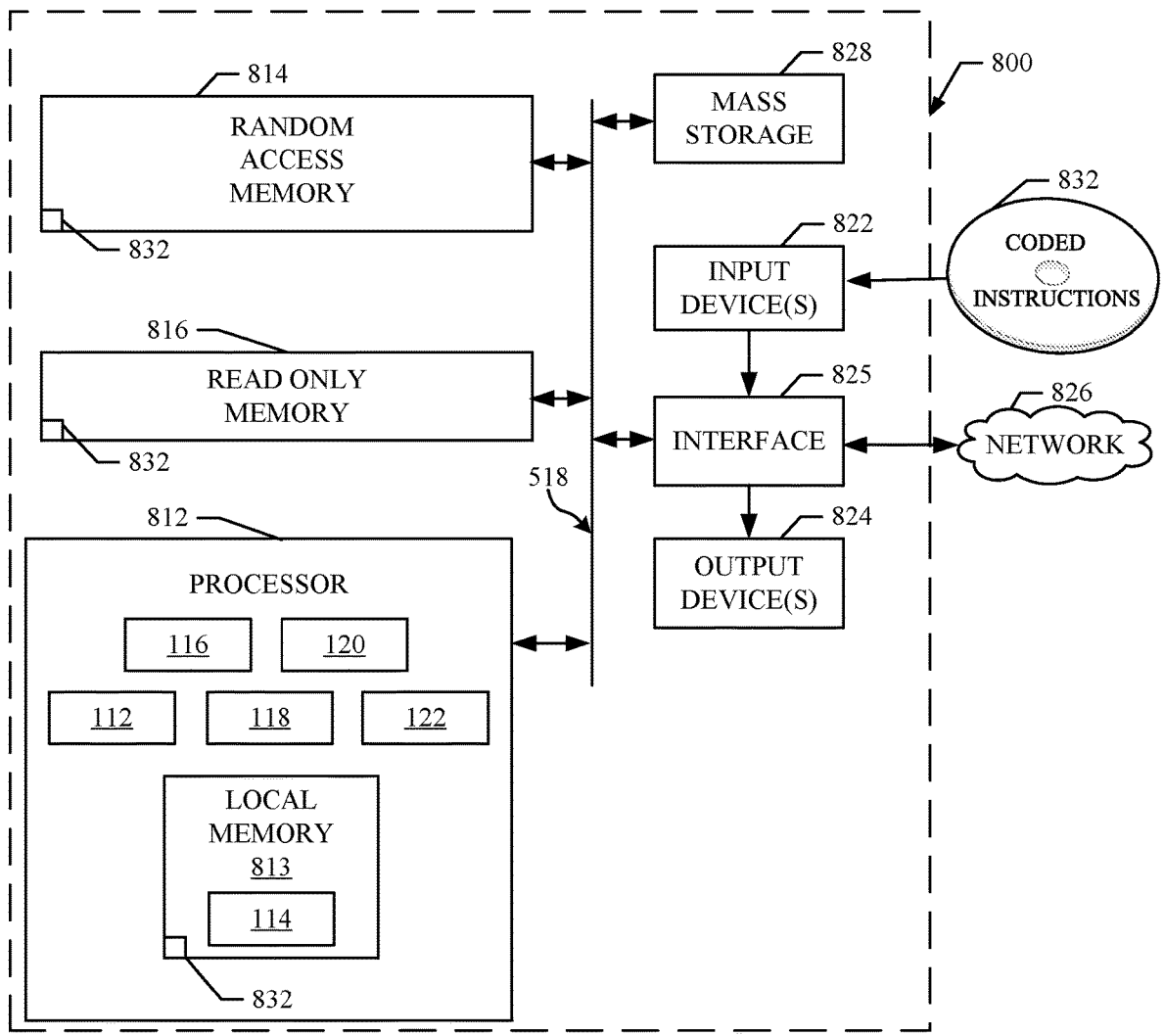
FIG. 8 is a block diagram of an example processing platform structured to execute the instructions of FIGS. 3, 4A, and/or 4B to implement the example label identifier of FIG. 1.

FIG. 8 is a block diagram of an example processor platform 800 structured to execute the instructions of FIGS. 3, 4A and/or 4B to implement the label identifier 110 of FIG. 1. The processor platform 800 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image resizer 112, the example model trainer 116, the example model implementor 118, the example data comparator 120, and the example report generator 122.

The processor 812 of the illustrated example includes a local memory 813 (e.g., a cache). In this example, the local memory 813 implements the example storage device(s) 114. However, the example volatile memory 814 and/or the example non-volatile memory 816 may implement the storage device(s) 114. The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 111. The interface circuit 111 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 111. The input device (s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 111 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 111 of the illustrated example, thus, typically includes a graphics driver card, a graphics driver chip, and/or a graphics driver processor.

The interface circuit 111 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 3, 4A, and/or 4B may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that classify labels based on images using artificial intelligence. The disclosed methods, apparatus and articles of manufacture are able to more efficiently link products to their corresponding labels based on images than traditional techniques for lower quality images. Because there is a high volume of lower quality images than studio quality images for products, examples disclosed herein can more effectively digitally link labels to products due to the higher efficiency and efficacy of examples disclosed herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
interface circuitry to receive first and second images corresponding to a product;
machine readable instructions; and
at least one processor circuit to execute the machine readable instructions to at least:
detect a first label in the first image, the first label defined by a first bounding box;
classify the first label based on the first bounding box;
detect a second label in the second image, the second label defined by a second bounding box;
classify the second label based on the second bounding box; and
when the first classification and the second classification are associated with the product, assign the first and second classifications to the product.

2. The apparatus of claim 1, wherein the first image corresponds to a first portion of the product and the second image corresponds to a second portion of the product, the first portion to be at least partially offset relative to the second portion.

3. The apparatus of claim 1, wherein one or more of the at least one processor circuit is to detect the first label by executing the machine readable instructions to:
extract a feature map from the first image, the feature map including points; and
apply a region proposal network to the feature map to:
generate, at respective ones of the points in the feature map, a set of anchor boxes based on predetermined anchor box sizes and anchor box ratios;
identify ones of the anchor boxes that include the first label, the ones of the anchor boxes to include a respective confidence score;
determine bounding box coordinates for the ones of the anchor boxes, the bounding box coordinates corresponding to positions relative to the first image; and
identify the first bounding box as including the label by applying a non-maximum selection technique to the ones of the anchor boxes.

4. The apparatus of claim 3, wherein the one or more of the at least one processor circuit is to execute the machine readable instructions to train the region proposal network by configuring a first hyperparameter corresponding to the predetermined anchor box ratios and a second hyperparameter corresponding to the predetermined anchor box sizes.

5. The apparatus of claim 4, wherein the one or more of the at least one processor circuit is to execute the machine readable instructions to configure the first hyperparameter to anchor box ratios of (a) 1:2, (b) 1:1, and (c) 2:1.

6. The apparatus of claim 4, wherein the one or more of the at least one processor circuit is to execute the machine readable instructions to configure the second hyperparameter to anchor box scales of 2, 4, and 6.

7. The apparatus of claim 1, wherein one or more of the at least one processor circuit is to execute the machine readable instructions to:
detect a third label in the second image, the third label defined by a third bounding box;
classify the third label based on the third bounding box; and
assign the third classification to the product.

8. A non-transitory machine readable storage medium comprising instructions to cause at least one processor circuit to at least:
detect a first label in a first image, the first label defined by a first bounding box, the first image to correspond to a first product;
classify the first label based on the first bounding box;
detect a second label in a second image, the second label defined by a second bounding box, the second image to correspond to the first product;
classify the second label based on the second bounding box; and
when the first classification and the second classification are associated with the product, assign the first and second classifications to the product.

9. The non-transitory machine readable storage medium of claim 8, wherein the first image corresponds to a first region of the product and the second image corresponds to a second region of the product, the first region to be at least partially different than the second region.

10. The non-transitory machine readable storage medium of claim 8, wherein the instructions cause one or more of the at least one processor circuit to:
extract a feature map from the first image, the feature map including points;
generate, by applying a region proposal network to the feature map, a set of anchors boxes at respective ones of the points in the feature map based on predetermined anchor box sizes and anchor box ratios;
identify ones of the anchor boxes that include the first label, the ones of the anchor boxes to include a respective confidence score;
determine bounding box coordinates for the ones of the anchor boxes, the bounding box coordinates corresponding to positions relative to the first image; and identify the first bounding box as including the first label by applying a non-maximum selection technique to the ones of the anchor boxes.

11. The non-transitory machine readable storage medium of claim 10, wherein the instructions cause the one or more of the at least one processor circuit to train the region proposal network by configuring a first hyperparameter corresponding to the predetermined anchor box ratios and a second hyperparameter corresponding to the predetermined anchor box sizes.

12. The non-transitory machine readable storage medium of claim 11, wherein the instructions are to cause the one or more of the at least one processor circuit to configure the first hyperparameter to anchor box ratios of (a) 1:2, (b) 1:1, and (c) 2:1.

13. The non-transitory machine readable storage medium of claim 11, wherein the instructions are to cause the one or more of the at least one processor circuit to configure the second hyperparameter to anchor box scales of 2, 4, and 6.

14. The non-transitory machine readable storage medium of claim 8, wherein the instructions are to cause the one or more of the at least one processor circuit to:
  detect a third label in the second image, the third label defined by a third bounding box;
  classify the third label based on the third bounding box; and
  assign the third classification to the product.

15. A method comprising:
  detecting, by executing a machine readable instruction with programmable circuitry, a first label in a first image, the first label defined by a first bounding box, the first image corresponding to a product;
  classifying, by executing a machine readable instruction with the programmable circuitry, the first label based on the first bounding box;
  detecting, by executing a machine readable instruction with the programmable circuitry, a second label in a second image, the second label defined by a second bounding box the second image corresponding to the product;
  classifying, by executing a machine readable instruction with the programmable circuitry, the second label based on the second bounding box; and
  when the first classification and the second classification are associated with the product, assigning, by executing a machine readable instruction with the programmable circuitry, the first and second classifications to the product.

16. The method of claim 15, wherein the first image corresponds to a first portion of the product and the second image corresponds to a second portion of the product, the second portion to be at least partially offset from the first portion of the product.

17. The method of claim 15, wherein the detecting of the first label includes:
  extracting a feature map from the first image, the feature map including points; and
  applying a region proposal network to the feature map, wherein the applying of the region proposal network to includes:
    generating, at respective ones of the points in the feature map, a set of anchors boxes based on predetermined anchor box sizes and anchor box ratios;
    identifying ones of the anchor boxes that include the first label, the ones of the anchor boxes to include a respective confidence score;
    determining bounding box coordinates for the ones of the anchor boxes, the bounding box coordinates corresponding to positions relative to the first image; and
    identifying the first bounding box as including the label by applying a non-maximum selection technique to the ones of the anchor boxes.

18. The method of claim 17, further including training the region proposal network by configuring a first hyperparameter corresponding to the predetermined anchor box ratios and a second hyperparameter corresponding to the predetermined anchor box sizes.

19. The method of claim 18, wherein the configuring of the first hyperparameter includes tuning the first hyperparameter to generate anchor box ratios of (a) 1:2, (b) 1:1, and (c) 2:1.

20. The method of claim 18, wherein the configuring of the second hyperparameter includes tuning the second hyperparameter to generate anchor box scales of 2, 4, and 6.

* * * * *